Patented Sept. 22, 1942

2,296,513

UNITED STATES PATENT OFFICE 2,296,513

PROCESS OF PRODUCING RUBBER FILMS OR DEPOSITS

Eskil Julius Gavatin and Beno Steiger, Stockholm, Sweden

No Drawing. Application January 4, 1941, Serial No. 373,196. In Sweden March 12, 1940

3 Claims. (Cl. 18—58)

It is known to produce rubber films or deposits from latex by dipping or spraying processes, by electro-endosmose, etc. In practice, dipping is generally preferred owing to the simple method of procedure, but on the other hand it has proved difficult to avoid the formation of pores and blisters in this method. When the production of very thin films or deposits is brought into consideration, for instance having a thickness of 0.04 millimetre, such formation of pores obviously is very detrimental, inasmuch as the strength of the rubber film may be jeopardized thereby. The discard percentage therefore seldom falls below 20% even if the most favourable working methods be made use of. Accurate investigations have shown that products made in a known manner by spraying on forms are marred by pores or microscopically minute perforations produced on account of the air blisters enclosed within the latex emulsion. The presence of these blisters obviously entails weak portions in the film or deposit, by reason of which the spraying method also shows a considerable percentage of discard. Consequently, this method has not found any wide use hitherto, in spite of the fact that it involves certain advantages from other points of view.

The present invention relates to a method suited for continuous operation for the manufacture of homogeneous rubber films or diaphragms free from pores and blisters. According to the invention, this result is achieved by relieving the latex emulsion of air and gas blisters enclosed within the same. This effect may be achieved by atomizing the latex emulsion in a gaseous or vaporous (volatile) medium so as to produce a mist or cloud of latex particles, the size of which being substantially larger than the colloidal size of the latex particle, i. e. about 0.2 to 5 $\mu$. In a finely divided state of this degree the latex particles do not contain any air blisters. Therefore, if this cloud is brought into contact with a form, arranged for instance in a closed or open chamber, the particles will deposit on this form so as to constitute a homogeneous film without air blisters and without forming any spongy rubber. A product thus produced is free from pores and is far more extensible than if made by the usual latex emulsion.

The atomization may also be effected in vacuum, and the produced blister-free latex suspension may be used for other processes than spraying, say dipping, etc.

To bring about the said expulsion of air, the atomization of the latex must be carried much farther than in the spraying methods hitherto employed, in which the removal of the air was never any point of consideration. It is highly surprising, too, that according to the invention the latex particles can be isolated from the surrounding air blisters in this manner so as to form particles, for instance in the form of a cloud, entirely relieved of blisters. For carrying the invention into effect it is immaterial per se how this cloud is produced, but a simple method is to bring about the atomization by means of a stream of air, vapour or gas forced ahead at a high rate of velocity, said gaseous stream then impinging upon one or more jets of the latex emulsion and atomizing the latter while imparting simultaneously a certain velocity to the cloud thus formed. Heretofore, it was not considered possible to remove the air blisters by such an air current. However, the atomization may also be carried into effect otherwise, for instance by causing the latex to fall in drops onto a rapidly rotating body or disk. If the gaseous medium required for the formation of the latex cloud is supplied simultaneously with the latex particles, it may be found suitable to evacuate the chamber containing the form or forms.

The above-mentioned latex cloud may be stationary or have a certain relative movement toward the form. In the latter case, the form should be at a certain distance from the place where the latex cloud is being formed, in order that the isolated latex particles shall have an opportunity to flow together so as to form a homogeneous film or deposit on the form. In one case a suitable distance was found to be about 25 centimeters, but the invention is obviously not limited to this numerical value. If the latex cloud is stationary, the time during which the form is permitted to be within the cloud should be controlled in a suitable manner so as to enable formation of the homogeneous film or deposit of any desired thickness.

If a nozzle, spray gun or the like is made use of for the production of the latex cloud, such nozzle may be arranged to be movable relatively to the form or forms which, in turn, may also be arranged to rotate about their own axis and/or to move through the cloud at a rate of velocity such that the latex particles may deposit to the desired thickness while the form is being moved through the cloud. The form may also be stationary, however. If a plurality of forms be arranged on a movable band, belt, table or other conveying contrivance, the method may be carried out continuously in its entirety. After the forms have been removed out of the chamber, drying and vulcanization may be effected in any known manner, whereupon the films or deposits may be stripped off the forms. However, the films or deposits may also be permitted to remain on the forms as a protective layer, if desired.

In the present specification and claims the term "latex" and "latex emulsion" is used in its broadest sense, i. e. including any rubber dispersion of natural or synthetic origin, which may be admixed with accelerators or other substances if desired. In the latter case the particles of the added substances preferably should also have a size falling below or within the said size of 0.2 to 5 $\mu$. According to the concentration of the latex, films or deposits of varying thicknesses may be produced.

As many changes could be made in the above process and many apparently widely different embodiments of the invention could be made without departing from the scope thereof, as defined by the following claims, it is intended that all matter contained in the above description shall be interpreted as illustrative and not in a limiting sense.

What we claim is:

1. A process of producing rubber deposits from latex emulsion comprising the steps of relieving the latex emulsion of enclosed blisters by atomization so as to form a cloud of latex particles in which the size of the latex particles after atomization at the most amounts to approximately 0.2 to 5 $\mu$.

2. A process of producing rubber deposits from latex emulsion comprising the steps of relieving the latex emulsion of enclosed blisters by atomization of a jet of the emulsion by forcing a stream of gas thereon so as to form a cloud of latex particles, at least the majority of the particles having at the most a colloidal size of 0.2 to 5 $\mu$, applying the produced blister-free latex onto a form and then removing the produced deposit from the form.

3. A process as claimed in claim 1, in which the deposit is dried before being removed from the form.

ESKIL JULIUS GAVATIN.
BENO STEIGER.

CERTIFICATE OF CORRECTION.

Patent No. 2,296,513. September 22, 1942.

ESKIL JULIUS GAVATIN, ET AL.

It is hereby certified that error appears in the printed specification of the above numbered patent requiring correction as follows: Page 2, second column, line 21, claim 3, for the claim reference numeral "1" read --2--; and that the said Letters Patent should be read with this correction therein that the same may conform to the record of the case in the Patent Office.

Signed and sealed this 27th day of October, A. D. 1942.

(Seal)

Henry Van Arsdale,
Acting Commissioner of Patents.